May 15, 1934.  W. H. RADFORD  1,958,862
TRACTOR
Filed Dec. 29, 1932  2 Sheets-Sheet 1

INVENTOR.
William H. Radford

May 15, 1934.   W. H. RADFORD   1,958,862
TRACTOR
Filed Dec. 29, 1932   2 Sheets-Sheet 2
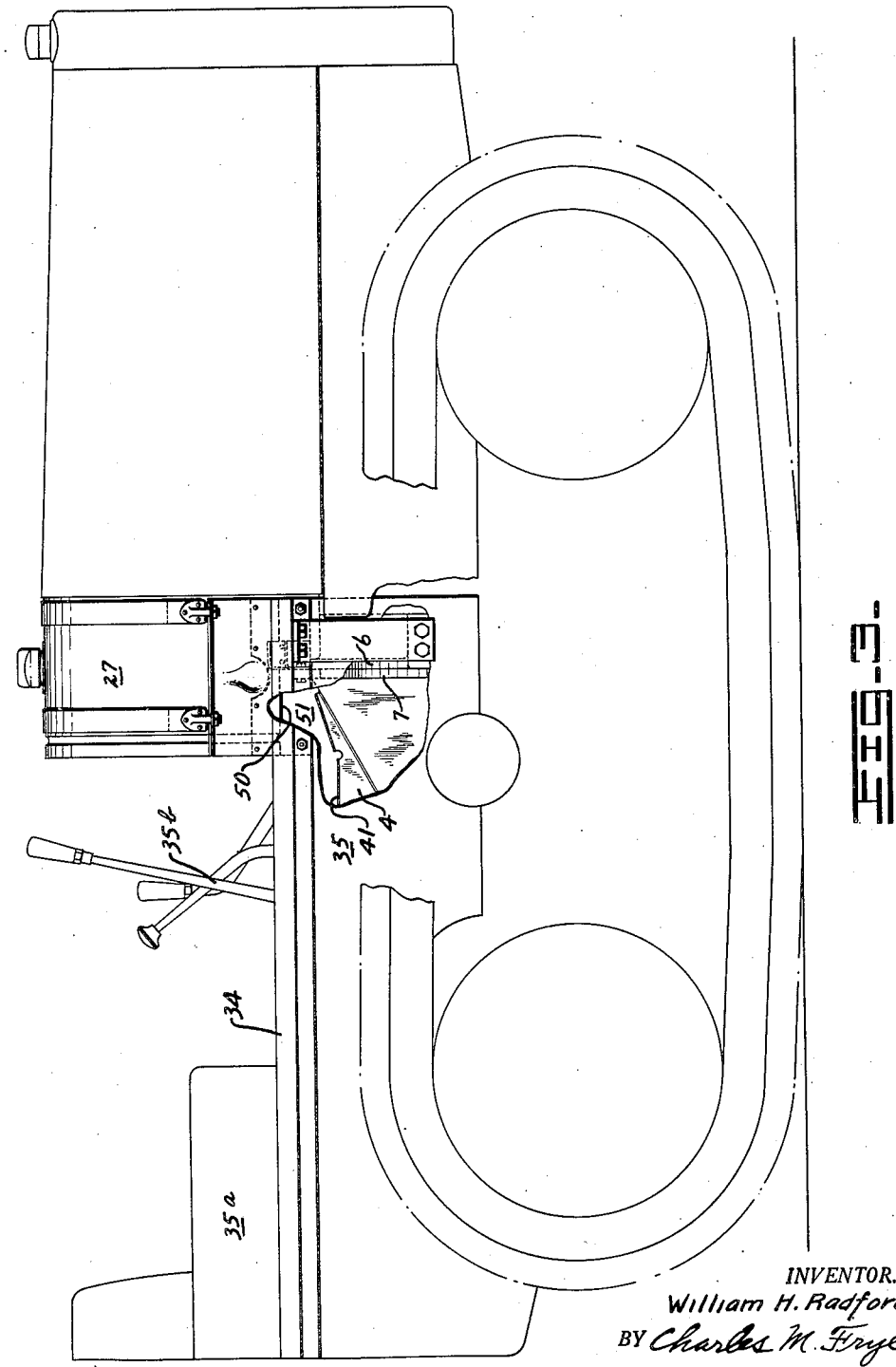
INVENTOR.
William H. Radford
BY Charles M. Fryer
ATTORNEY.

Patented May 15, 1934

1,958,862

UNITED STATES PATENT OFFICE 1,958,862

TRACTOR

William H. Radford, Peoria, Ill., assignor to Caterpillar Tractor Co., San Leandro, Calif., a corporation of California Application December 29, 1932, Serial No. 649,239

4 Claims. (Cl. 180—54)

The present invention relates to tractors and more particularly to the arrangement of tractor construction to provide a fuel tank mounting.

In known types of tank mounting means the tank is located either over the tractor engine or longitudinally along one side of the operator's compartment. When the tank is located over the engine it is subjected to an excessive amount of heat from the engine which causes boiling of the fuel. Thus a great deal of fuel is lost. This is true even though the temperature of the fuel does not reach the boiling point as more rapid evaporation takes place with any increase of temperature. When the tank is located away from the engine to one side of the operator's seat, the above disadvantages are overcome but still others follow from this arrangement. The operator can enter at only one side of his compartment which is not only inconvenient but also causes a loss of time when the operator has to get on or off the tractor. Another disadvantage is presented as the operator's view is cut off by the tank so that he is not able to maneuver the tractor as easily as when his view to both sides of the tractor is unimpaired. Moreover this location of the tank complicates the provision of fuel lines from the tank to the carburetor. This is true because the tank is located at a considerable distance from the carburetor and the longer fuel lines are not only harder to install but also break or leak more easily as they are subjected to greater stresses during operation of the tractor. Furthermore, as the tank is positioned longitudinally of the tractor and away from the middle thereof a fuel line must be provided at each end thereof to provide a sure supply of fuel when the tractor is travelling up or down hill, or over uneven ground.

The invention disclosed herein overcomes the above outlined disadvantages by providing tank mounting means whereby the tank is positioned transversely of the tractor frame at substantially the mid-point thereof. The tank forms a dashboard closing the front of the operator's compartment and preventing the transmission of hot gases to the operator's compartment. The tank being located above the frame at substantially the mid-point thereof is less subject to tilting so that the fuel supply for the carburetor is not interrupted when the tractor is travelling over rough or hilly ground. This location of the tank is sufficiently close to the engine to simplify the provision of fuel lines while not so near as to cause loss of fuel by evaporation. It is to be noted that in this location the tank is not a mere attachment but forms an integral part of the tractor structure.

It is an object of the invention to provide a tractor having a fuel tank mounted on the frame at substantially the mid-point thereof.

Another object of the invention is to provide a fuel tank for a tractor which is mounted on a substantially cylindrical housing.

Another object of the invention is to provide a firm and rigid support for the fuel tank on a tractor.

Another object of the invention is to provide a tank support on a tractor of such a character that the tank can easily be installed and removed.

Another object of the invention is to provide a tank mounting in a tractor whereby the tank forms a dashboard.

Another object of the invention is to mount a tank on the main frame of the tractor intermediate the length thereof.

Another object of the invention is to provide a tractor having a main frame, comprising a transmission case and crankcase secured together, and a tank mounted on the frame.

Another object of the invention is to provide a tank mounting in a tractor having a main frame, comprising a transmission case and crankcase secured together, the tank being located transversely of the frame adjacent the connection between the transmission case and the crankcase.

Another object of the invention is to mount a tank in a tractor whereby it forms the front wall of a compartment, the side walls of which are formed by the fenders while the rear wall is the operator's seat.

Another object of the invention is to provide a tractor having the tank mounted transversely of the frame between the fenders.

Another object of the invention is to provide a tractor having a tank supporting means including the main frame.

Another object of the invention is to provide a tractor having a tank positioned between the fenders of the tractor.

Another object of the invention is to provide a tractor having a tank positioned between the side walls of an operator's compartment.

Another object of the invention is to provide a tractor having tank supporting means including the crankcase and the transmission case.

Another object of the invention is to provide a tractor having a fuel tank mounted transversely of the machine between the engine and the operator's compartment.

Another object of the invention is to provide a tractor having a fuel tank mounted therein immediately behind the engine.

The foregoing and other objects are attained in the embodiment of the invention shown in the drawings.

Description of drawings

Fig. 1 is a transverse section of a tractor taken immediately in front of the tank, looking towards the rear of the tractor, the tank and tank support being shown in end elevation while the fenders are shown in section.

Fig. 2 is a fragmentary right side elevation of the tractor showing the tank and tank support, the engine located forwardly of the tank and a portion of the operator's compartment located rearwardly of the tank, being omitted.

Fig. 3 is a view similar to Fig. 2, illustrating a complete tractor schematically.

*Description of mechanism*

The tractor includes a main frame 2 which comprises crankcase 3 (Fig. 2) and transmission case 4 provided with circular perforated flanges 6 and 7 at their substantially cylindrical inner ends which are bolted together. Flanges 6 and 7 are located at substantially the mid-point of the tractor. Said flange 7 of the transmission case is provided at its top with peripherally extending pad 8 (Figs. 1 and 2) to which the tank supporting means is attached. Beam 12 is connected to pad 8 by bolts 9 and 10, and said beam comprises a member fabricated of pressed metal having dihedral flanges 13 and 14 terminating in down-turned portions 16, 17 at the opposite ends thereof. Abutting the beam is disposed a saddle 18, also preferably of pressed metal, which extends transversely of the frame and terminates in vertically disposed ears 19, 20, co-planar with the portions 16, 17 of the beam.

Suitably fastened to the extremity of beam 12 and saddle 18 are end plates 22, 23, likewise preferably constructed of pressed metal. The two end plates are similar in contour and each includes an upper flange 24 and an inwardly formed portion having a projection 26 adapted to contact fuel tank 27 which is placed on saddle 18. The projections 26 (Fig. 1) being in close contact with tank 27 are effective to constrain transverse movement of the tank, and in order to confine the tank against vertical displacement, it is encompassed with a pair of straps 28, 29 (Figs. 1 and 2) terminating in bolts 31, 32 adapted to pass through the pierced flanges 24 on end plates 22. The terminus of each of the bolts 31 and 32 is threaded to receive a secured nut 33 by means of which the straps 28 and 29 can be tightly held against the tank, and the tank in turn held on its seat on saddle 18.

From the foregoing description, it is seen that the tank is mounted transversely of the frame above the connection between the crankcase and the transmission case intermediate the length of the frame.

The tank 27 being disposed transversely of the frame behind the engine serves as a dashboard to prevent the transmission of hot gases to the operator's compartment from the engine, and forms the upper part of the front wall of the operator's compartment, the side walls of which are formed by the fender assembly side plates 35 while the operator's seat 35a closes the rear end of the compartment. The top of the transmission case forms the floor of the compartment and provides a mounting for various tractor controls 35b. The fenders also serve as additional connections between the tank support and the frame of the tractor.

Down-turned portions 16, 17 (Fig. 1) of beam 12 and plates 22, 23 are connected to respective horizontal plates 34 and vertical plates 35 of the fender assemblies by bolts 36. Respective braces 37 have their upper horizontal portions secured to plates 34 and their vertical portions secured to plates 35 and pads 39 formed integrally with crankcase 3 by screws 40. Thus the fender assemblies provide connections whereby the ends of the transversely disposed tank are supported from the frame of the tractor. As shown in Fig. 2, plates 34 and 35 extend rearwardly from tank 27 to form the side walls of the operator's compartment. Cover 41 (Fig. 2) for transmission case 4 provides a floor for the compartment which extends substantially horizontally from a position below the underside 50 of tank 27 which provides a dashboard and closes the front of the compartment. It is to be noted that the inner end of the transmission case 4 where it is bolted at flanges 6 and 7 to the crankcase 3, the front ends of fender assembly side plates 35, and the underside 50 of tank 37 which is of substantially the same width as the transmission case form side pockets 51 into which the operator's feet can extend.

I, therefore, claim as my invention:

1. In a tractor, a frame having a central substantially cylindrical portion, fender assemblies mounted on said frame, a fuel tank mounted on said frame, said frame, said fender assemblies, and said fuel tank forming the floor, side walls, and front wall, respectively, of an operator's compartment, said fuel tank being positioned to extend transversely across and above said frame whereby the curved sides of said central portion with said tank and said fender assemblies form pockets into which the operator's feet can extend.

2. In a tractor, an engine crankcase, having a flange at one end thereof extending transversely and across the top thereof, a transmission case having a flange at one end thereof extending transversely and across the top thereof, said flanges being joined together to provide a joint between said crankcase and said transmission case, a support on one of said flanges, fender assemblies secured to the sides of said transmission case, a fuel tank, a frame for mounting said tank, said frame being attached to and supported by said fender assemblies and said support whereby said tank is supported above said joint between said crankcase and said transmission case.

3. In a tractor having a main frame comprising a transmission case and a crankcase forming an integral structure; a power plant adjacent the front of said frame; means for closing off the power plant from the rear of said frame, said means comprising a fuel tank extending transversely over said main frame and completely at the rear of said power plant, the underside of said tank being spaced with respect to said main frame to provide pockets; and side members at the sides of the main frame closing the sides of said pockets.

4. In a tractor having a main frame comprising a transmission case and a crank case forming an integral structure; a power plant adjacent the front of said frame; means for closing off the power plant from the rear of said frame, said means comprising a fuel tank extending transversely over said main frame and completely at the rear of said power plant, the under side of said tank being spaced with respect to said main frame to provide pockets; and side fender assemblies including side members at the sides of the main frame closing the sides of said pockets, said fender assemblies extending rearwardly a substantial distance to provide side walls for an operator's compartment.

WILLIAM H. RADFORD.